United States Patent
Tang et al.

(10) Patent No.: US 9,521,182 B1
(45) Date of Patent: Dec. 13, 2016

(54) SYSTEMS AND METHODS RELATED TO IDENTIFYING AUTHORSHIP OF INTERNET CONTENT

(71) Applicant: Google Inc., Mountain View, CA (US)

(72) Inventors: Jonathan David Tang, Mountain View, CA (US); Robert Jonathan Ennals, San Francisco, CA (US); Benedict Gomes, Palo Alto, CA (US); Matthew Cutts, San Francisco, CA (US)

(73) Assignee: Google Inc., Mountain View, CA (US)

( * ) Notice: Subject to any disclaimer, the term of this patent is extended or adjusted under 35 U.S.C. 154(b) by 698 days.

(21) Appl. No.: 13/762,870

(22) Filed: Feb. 8, 2013

(51) Int. Cl.
*G06F 15/16* (2006.01)
*H04L 29/08* (2006.01)

(52) U.S. Cl.
CPC ................................ *H04L 67/02* (2013.01)

(58) Field of Classification Search
CPC ....................................................... H04L 67/02
See application file for complete search history.

(56) References Cited

U.S. PATENT DOCUMENTS

| | | |
|---|---|---|
| 8,150,860 B1 | 4/2012 | Cierniak et al. |
| 8,291,492 B2 | 10/2012 | McNally et al. |
| 2009/0165128 A1* | 6/2009 | McNally et al. ............ 726/21 |

* cited by examiner

*Primary Examiner* — Hee Soo Kim
(74) *Attorney, Agent, or Firm* — Middleton Reutlinger (57) ABSTRACT

Methods and apparatus related to identifying authorship of Internet content. Some implementations are directed to methods and apparatus for identifying a content submission form on a webpage, recognizing submission of content by a user via the content submission form, and transmitting verification data in response to submission of the content by the user. The verification data may include content data indicative of at least some of the content submitted for publication via the content submission form.

22 Claims, 5 Drawing Sheets

SYSTEMS AND METHODS RELATED TO IDENTIFYING AUTHORSHIP OF INTERNET CONTENT

BACKGROUND

This specification is directed generally to identifying authorship of Internet content. Documents on the Internet sometimes include authorship information. For example, a document may include authorship information in the text of the document itself and/or in structured data of the document asserting that a particular entity authored the document. However, the authorship information may not be accurate and/or may not be valid. Also, many documents may not include authorship information.

SUMMARY

The present disclosure is directed to methods and apparatus for identifying authorship of Internet content. For example, some implementations are directed to methods and apparatus for identifying a content submission form on a webpage, recognizing submission of content by a user via the content submission form, and transmitting verification data in response to submission of the content by the user. The verification data may include content data indicative of at least some of the content submitted for publication via the content submission form.

In some implementations a computer implemented method is provided and includes the steps of: identifying a content submission form on a webpage, wherein the content submission form enables submission of user provided content to a destination address for publication of the content to a publication address; identifying publication address data, the publication address data indicative of the publication address at which content submitted via the content submission form will be published; identifying user identification data associated with a user; recognizing submission of the content by the user via the content submission form; transmitting, in response to submission of the content by the user, the publication address data, the user identification data, and content data indicative of at least some of the content to a verification address for authorship verification, the verification address distinct from the destination address.

This method and other implementations of technology disclosed herein may each optionally include one or more of the following features.

The step of recognizing submission of the content by the user via the content submission form may include initializing a form submission handler to recognize submission of the content by the user. In some implementations the form submission handler may be initialized through a browser plug-in. In some implementations the form submission handler submits the content to the destination address and transmits the destination URL data, the user identification data, and the content data to the verification address for authorship verification. In some implementations the form submission handler transmits the destination URL data, the user identification data, and the content data to the verification address for authorship verification and a second form submission handler submits the content to the destination address.

The content submission form may include a submission element enabling submission of the content by the user via the content submission form. In some implementations the transmitting step is performed in response to selection of the submission element by a user.

The method may further include the step of transmitting, in response to submission of the content by the user, time stamp data indicative of time of submission of the content by the user via the submission form.

The method may further include the step of verifying the user as an author of the content based on the publication address data, the user identification data, and the content data.

The content data may include the entirety of the content. In some implementations the method may further include the step of verifying the content is present at the publication address. In some implementations the method may further include the step of verifying the user as an author of the content in response to verifying the content is present at the destination URL.

The content data may include a content token indicative of the content. In some implementations the method may further include the step of incorporating the content token in the submission of the content by the user to the destination address. In some implementations the method may further include verifying the content token is included with the content at the publication address and verifying the user as an author of the content in response to verifying the content token is included with the content at the publication address.

The publication address data may be based on the destination address. In some implementations the method may further include identifying the publication address via crawling one or more documents, wherein the documents are identified for crawling based on the destination address and include a publication document that is accessible at the publication address.

The publication address data may include the publication address.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein process a webpage to identify a content submission form of the webpage and to transmit verification data in response to submission of content by a user via the content submission form. The verification data may be utilized by one or more authorship identification engines to identify an author with a published document. Particular implementations of the subject matter described herein may utilize supplied verification data to index a document as being associated with an author. Particular implementations of the subject matter described herein may additionally and/or alternatively utilize supplied verification data to determine the relevance of a document based on whether the document is associated with an author and/or with which author a document is associated. Particular implementations of the subject matter described herein may additionally and/or alternatively utilize supplied verification data to determine a change rate of a document and/or a website.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
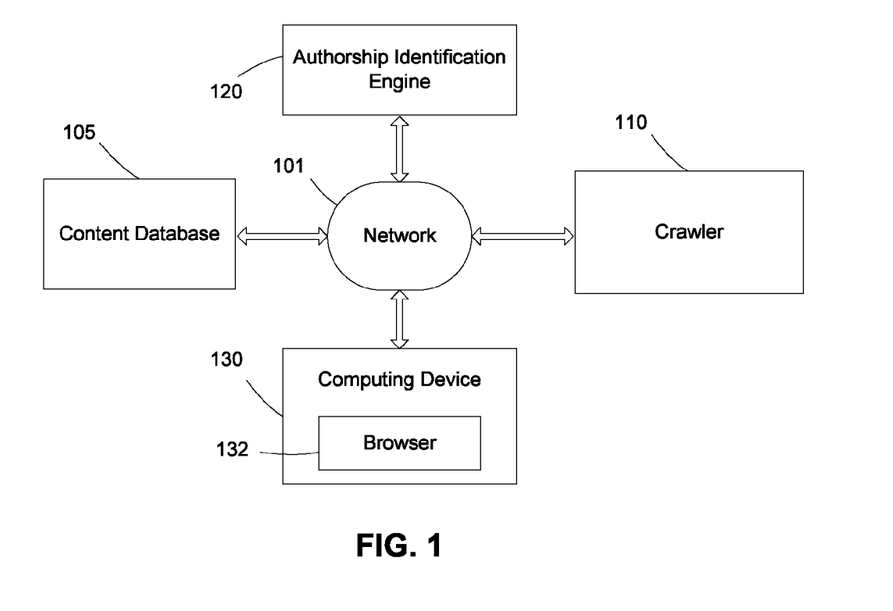
FIG. 1 is a block diagram of an example environment in which authorship of Internet content may be identified.

FIG. 1 illustrates a block diagram of an example environment in which authorship of Internet content may be identified. The communication network 101 facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques. The example environment also includes a content database 105, a crawler 110, an authorship identification engine 120, and a computing device 130.

The crawler 110 may be utilized to crawl one or more documents via the network 101. A document is any data that is associated with a document address. Documents include HTML pages, word processing documents, portable document format (PDF) documents, images, video, and feed sources, to name just a few. The documents may include content such as, for example: words, phrases, pictures, etc.; embedded information (such as meta information and/or hyperlinks); and/or embedded instructions (such as JavaScript scripts).

The crawler 110 may traverse documents accessible via the network 101, analyze the content of the documents, and/or index some of the content of the documents. For example, in some implementations the crawler 110 may index content of one or more documents based on a listing of documents. In some implementations the listing of documents to crawl may be provided specifically for authorship identification. The content may be indexed and stored in one or more databases such as, for example, content database 105. In some implementations content database 105 may be directly and/or indirectly coupled to only the crawler 110 and/or the authorship engine 120. For example, in some implementations the content database 105 may be coupled to only the authorship engine 120. In some implementations the content database 105 may be private and optionally not read accessible via the Internet. In some implementations the crawler 110 may step through the documents in a list, may analyze the contents of each document in the list, and may optionally identify links to other documents in one or more documents in the list. The crawler 110 may optionally make requests to any linked-to documents and repeat the analysis and linking process with such linked-to documents. The crawler 110 may also optionally store a list of all documents it has accessed so that it does not make repeated accesses to a document that is linked to from multiple locations. In some implementations the crawler 110 may only access one or more documents in a listing of documents provided for authorship identification and not access any linked-to documents.

In some implementations the crawler 110 may crawl one or more documents as part of a periodic crawling process for the documents. For example, documents may be periodically crawled based at least in part on popularity and/or an update frequency of those documents and/or of other documents that link-to those documents. In some implementations the crawler 110 may additionally and/or alternatively crawl one or more documents in response to an on-demand indexing request from an owner of the documents and/or other interested party. Also, for example, in some implementations the crawler 110 may crawl one or more documents in response to transmission of data related to that document for authorship verification. For example, in response to a user submitting content to be published as all or part of a document and a corresponding transmission of data related to that content for authorship verification, the document may be added to a queue of a listing of documents for crawling by the crawler 110. Also, for example, in response to a user submitting content to be published as all or part of a webpage of a website, and a corresponding transmission of data related to that content for authorship verification, the website may be added to a queue of a listing of documents for crawling by the crawler 110

The crawler 110 may provide identifying information of one or more of the documents and published data indicative of crawled actual content of the document to authorship identification engine 120 to enable authorship identification engine 120 to identify an author of the document. Authorship identification engine 120 is in communication with crawler 110 via network 101. In some implementations the authorship identification engine 120 receives identifying information of one or more of the documents and/or published data indicative of crawled actual content of the document directly from the crawler 110 and one or more intermediary servers. In some implementations the crawler 110 stores identifying information of one or more of the documents and/or published data indicative of crawled actual content of the document to one or more databases, such as the content database 105, and the authorship identification engine 120 retrieves the respective data from the one or more databases. In some implementations all and/or aspects of the identification engine 120 and crawler 110 may be combined as part of a single system.

The data provided by the crawler 110 that is indicative of one or more of the documents may include, for example, a document address such as a URL and/or other identifier of the document. The published data provided by the crawler 110 that is indicative of crawled actual content of one or more of the documents may include, for example, the entirety of the content of a document, one or more portions of content from the document, a hash of the entirety of the content, and/or a hash of one or more portions of the content. For example, the crawler 110 may provide at least some structured data of the document, a property of the document, a content token that is embedded in the document, a hash of at least some of the document, and/or one or more aspects of the document that would be provided when the document is retrieved.

Figure 4:
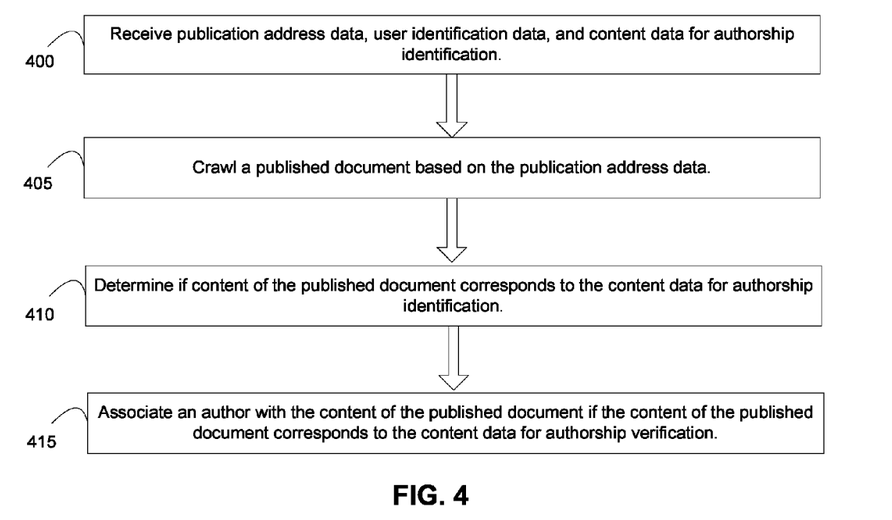
FIG. 4 is a flow chart illustrating an example method of identifying an author with Internet content based on received authorship verification data.

In some implementations the crawler 110 may perform one or more of the steps of the method of FIG. 4 such as steps 400, 405, and/or 410. The crawler 110 may be implemented in hardware, firmware, and/or software running on hardware. For example, the crawler 110 may be implemented in one or more computer servers.

The authorship identification engine 120 may compare the published data indicative of content of the document to content data of verification data submitted for authorship identification of the document. The content data may be associated with user identification data of the verification data and/or optional publication address data of the verification data. The user identification data identifies an author of the document and the publication address data identifies information about the document location such as a document address or other identifier of the document. If the published data for a document is found to match the content data for the document, then the document may be identified as being associated with an author. For example, in some implementations the authorship identification engine 120 may communicate with the crawler 110 to identify the document as a verified authorship document and the crawler 110 may index the document as a verified authorship document. Also, for example, in some implementations the authorship identification engine 120 may provide the author of the document to the crawler 110 and the crawler 110 may index the document as being associated with the provided author. In some implementations the authorship identification engine 120 may optionally analyze time stamp data optionally included with the authorship verification data in determining if the author should be identified with the document. The time stamp data may be indicative of the time of submission of content and may be utilized to determine if the content was submitted prior to any similar content also submitted for authorship identification. Analysis of any provided time stamp data may prevent attempts to claim authorship of the copied published content.

One or more methods and/or apparatus may be utilized to compare the published data indicative of content of the document to content data submitted for authorship identification of the document. For example, the text submitted via a content submission form for publication in a document may be provided as content data for authorship verification of the document and compared to published text of the document. In some implementations an exact match between the text of a document provided for authorship verification of a document and the published text of the document may be required. In some implementations authorship of a document may be verified if a similarity threshold is met. For example, one or more measures of similarity and/or dissimilarity may be utilized to determine if a similarity threshold between the text of a document provided for authorship verification of a document and the published text of the document is met. For example: a Levenshtein edit distance between the text provided for authorship verification and published text may be utilized; a Jaro-Winkle edit distance between the text provided for authorship verification and published text may be utilized; a Jaccard index may be utilized; a Masi distance may be utilized; and/or character counts between the text provided for authorship verification and the published text may be utilized.

Also, for example, a content token may be provided as content data for authorship identification of the document and compared to a content token of the document. For example, in some implementations the content token may include a hash value generated by applying a hash function to some or all of the content submitted for publication in a document. The hash value may be injected into the content of the document for publication and may be provided for authorship identification. The hash value provided for authorship identification may be compared to a hash value in the published document to identify authorship of the document. Also, for example, in some implementations the content token may include a random number injected into the content of the document for publication and provided for authorship identification. The random number provided for authorship identification may be compared to any random number in the published document to verify authorship of the document.

In some implementations a content token may be injected into non-displayed data of a document. For example, in some implementations a content token may be delivered in the background with a document utilizing a protocol such as AJAX and/or as an iframe element. Also, for example, the content token may be included in structured data of a document. For example, in some implementations a content token may be embedded as all or part of image tags in a webpage. In some implementations a content token may additionally and/or alternatively be injected into displayed data of a document.

In some implementations the authorship identification engine 120 may perform one or more of the steps of the method of FIG. 4 such as steps 400, 410, and/or 415. The authorship identification engine 120 may be implemented in hardware, firmware, and/or software running on hardware. For example, the authorship identification engine 120 may be implemented in one or more computer servers.

One or more computing devices 130 may provide the verification data to the authorship identification engine 120 for authorship verification of the document. Authorship identification engine 120 is in communication with computing device 130 via network 101. In some implementations the authorship identification engine 120 receives verification data for one or more of the documents directly from the computing device 130 and one or more intermediary servers. In some implementations the verification data for one or more of the documents is transmitted by the computing device 130, stored in one or more databases, such as the content database 105, and the authorship identification engine 120 retrieves the respective data from the one or more databases. The verification data may include, for example, publication address data, user identification data, and content data.

The content data is indicative of at least some of the content that is being provided by a user of the computing device 130 for publication in one or more documents. For example, in some implementations the content data includes the entirety of the content that is being provided for publication. Also, for example, in some implementations the content data includes one or more portions of the content that is being provided for publication. Also, for example, in some implementations the content data includes a content token associated with all or portions of the content that is being provided for publication.

The publication address data is indicative of a URL to which the content that is being submitted for publication will be published. For example, in some implementations the publication address data is the URL to which the content that is being submitted for publication will be published. Also, for example, in some implementations the publication address data is an identifier that may be utilized to identify the URL to which content that is being submitted for publication will be published. Also, for example, in some implementations the publication address data is an identifier that may be associated with a URL in a database. In some implementations the publication address data includes the hostname to which content that is being submitted for publication is being submitted. The hostname may be utilized to determine a website and/or a particular URL to which the content being submitted for publication will be published.

The user identification data is indicative of data that identifies an author of the document. For example, the user identification data may be a user identification for one or more services. For example, the user identification may be for a service to which a user of the computing device 130 is logged in when submitting the content provided for publication. For example, the service may include a social networking service, a search service, an email service, and/or an authorship identification service. Also, for example, the user identification may based on an IP address, a MAC address, and/or other identifier. In some implementations the user may be logged in to a service via the computing device 130 when content data is submitted and log in credentials for the service may be provided by the computing device 130 for authentication to identify the user as the author of the content associated with the content data. In some implementations the log in credentials and/or other user identification data may be identified and/or communicated via a cookie.

In some implementations the verification data may optionally include time stamp data indicative of the time of submission of content via the content submission form. The time stamp data may be utilized to determine if the content was submitted prior to any similar content also submitted for authorship identification by a different user. In some implementations the time stamp data is provided by the computing device 130. In some implementations the time stamp data is associated with verification data provided by the computing device 130 after the verification data has been provided by the computing device. For example, time stamp data may be generated and associated with the verification data by the authorship identification engine 120 after receipt of the verification data from the computing device 130.

The verification data may be provided by the computing device 130 in response to a user of the computing device 130 submitting content for publication in one or more documents via the computing device 130. In some implementations the content is submitted to a content management system for publication. The content management system may publish the content as one or more documents that are stored in a database and accessible via a document address. For example, an article may be submitted to a content management system, stored in a database, and accessible via a URL. In some implementations the verification data is provided in response to the user of the computing device 130 submitting content for publication via one or more web browsers (e.g., web browser 132) executing on the computing device 130. In some implementations one or more scripts may be activated on the computing device 130 that identify one or more types of active content submission forms on a web page displayed by the web browser and, upon submission of content by a user via the form, transmits verification data. The verification data may include content data based on the content submitted via the form and publication address data based on analysis of the form. In some implementations the scripts may include one or more extensions. For example, the scripts may include a bookmarklet and/or a browser plug-in such as a Chrome Extension for a Google Chrome web browser and/or a Greasemonkey extension for a Mozilla Firefox web browser. In some implementations the scripts may be integrated as a standard feature of one or more web browsers.

In some implementations the computing device 130 identifies an active form on a webpage by analyzing the content of the webpage. For example, in some implementations the computing device 130 identifies an active form by recognizing content indicative of a form. For example, in some implementations the computing device 130 identifies an active form by recognizing a content submission event in code of the webpage. Also, for example, in some implementations the computing device 130 identifies an active form by recognizing an HTML <form> tag in code of the webpage. In some implementations the computing device 130 identifies if a form is provided for the publication of content. For example, some forms may be provided for submission of content that is to be published while other forms are provided for submission of content that is not to be published such as user registration forms, payment information forms, etc. In some implementations the computing device 130 may identify whether a form is provided for publication of content based on the content of the form itself. For example, in some implementations the computing device 130 may identify whether a form is provided for publication of content based on the title of one or more fields of the form. Also, for example, in some implementations the computing device 130 may identify whether a form is provided for publication of content based on the destination address to which the content submitted via the form will be submitted. Also, for example, in some implementations the computing device 130 may identify whether a form is provided for publication of content based on structured data associated with the form that identifies the form as a form provided for publication of content. For example, in some implementations the computing device 130 may identify whether a form is provided for publication of content based on the presence of a tag, such as a <textarea> tag, that may indicate multiline text input.

In some implementations the computing device 130 may identify whether a form is provided for publication of content based additionally and/or alternatively on text of the webpage. For example, certain terms provided on a webpage with a form may be indicative of an active form that is provided for publication of content such as, for example: "post"; "comment"; "edit"; and/or "publish". In some implementations the computing device 130 may identify whether a form is provided for publication of content based additionally and/or alternatively on the URL of the webpage. For example, some URLs may be associated with forms that are provided for publication of content. For example, a listing of URLS that are associated with forms that are provided for publication of content may be identified in a database. Also, for example, one or more aspects of a URL may be indicative of an active form that is provided for publication of content. For example, the presence of certain terms in a URL such as "action=edit" may indicate that an active form is present on the webpage and/or that the active form is provided for publication of content.

In response to submission of content by a user via a form provided for publication of content, the computing device 130 transmits verification data to the authorship identification engine 120 and/or the crawler 110. In some implementations the computing device 130 installs an onsubmit( ) handler that, upon submission of the form, provides the verification data to the authorship identification engine 120, while still enabling submission of the content to be published to the destination address associated with the form. In some implementations the verification data is provided to the authorship identification engine 120 and/or the crawler 110 via an iframe, an img tag, and/or other AJAX transport mechanism.

Figure 2:
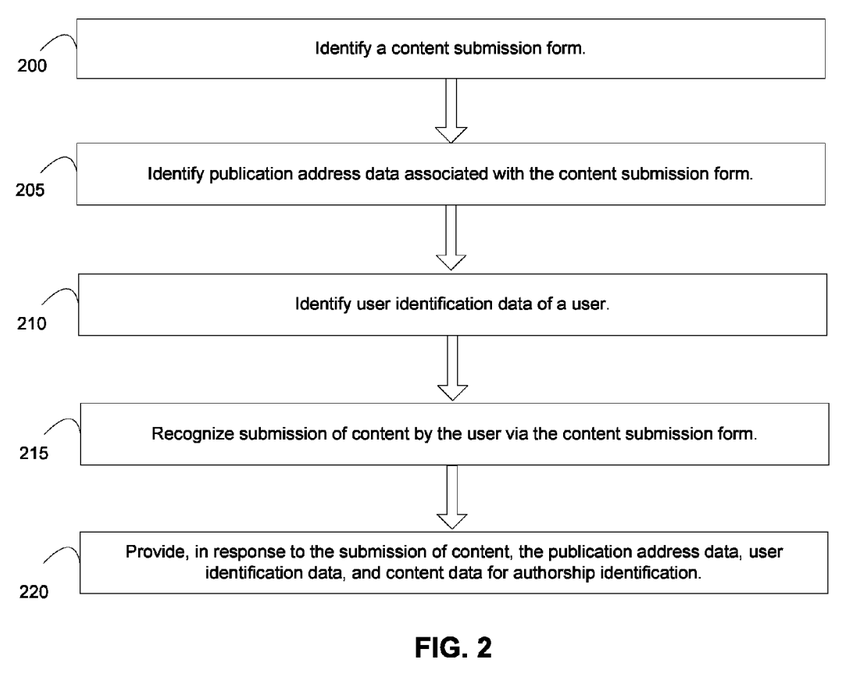
FIG. 2 is a flow chart illustrating an example method of identifying and transmitting data related to authorship identification of Internet content.

In some implementations the computing device 130 may perform one or more of the steps of the method of FIG. 2. The computing device 130 may be implemented in hardware, firmware, and/or software running on hardware. For example, computing device 130 may be implemented in one or more desktop computers, laptops, tablet devices, and/or smartphones.

Many other configurations are possible having more or less components than the environment shown in FIG. 1. For example, in some environments the content database 105 may be omitted. Also, for example, in some environments the authorship identification engine 120 and/or the crawler 110 may be combined.

Referring to FIG. 2, a flow chart illustrates an implementation of identifying and transmitting data related to Internet content for authorship identification. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may include, for example, the computing device 130 and/or the authorship identification engine 120 of FIG. 1.

At step 200 a content submission form is identified. For example, with reference to FIG. 3A, the content submission form of FIG. 3A may be identified. The content submission form of FIG. 3A includes a content submission field 304A and a content submission element 306A. Also, for example, with reference to FIG. 3B, the content submission form of FIG. 3B may be identified. The content submission form of FIG. 3B includes a content submission field 304B and a content submission element 306B.

In some implementations one or more scripts may be activated that identify one or more types of active forms displayed by the computing device 130. For example, the script may identify any active content submission forms displayed by a web browser of the computing device 130. In some implementations the script may execute on computing device 130. In some implementations the script may partially or wholly execute on a remote computing device in response to actions on the computing device 130 such as the display of an active form on the computing device 130. For example, in some implementations one or more aspects of the script may be executed by authorship identification engine 120 and identify active content submission forms on client device 130. In some implementations the scripts may include one or more application extensions. For example, the scripts may include a bookmarklet and/or a browser plug-in. In some implementations the scripts may be integrated as a standard feature of one or more web browsers and/or other applications.

In some implementations the computing device 130 identifies an active form on a webpage by analyzing the content of the webpage. For example, in some implementations the computing device 130 identifies an active form by recognizing content indicative of a form. For example, the content submission form of FIG. 3A and/or FIG. 3B may be recognized based on code of the webpage utilized to implement the content submission form. For example, a content submission form may be recognized based on the presence of a form submission handler and/or one or more tags related to forms such as "<form id= . . . >", "<form name= . . . >", and/or "</form>".

In some implementations the computing device 130 identifies if a form is provided for the submission and subsequent publication of content. In some implementations the computing device 130 may identify whether a form is provided for publication of content based on the content of the form itself. For example, the code utilized to implement the content submission form may be indicative of a form provided for submission and publication of content. Also, for example, text displayed within the form may be indicative of a form provided for publication of content. For example, the text "Submit Edits" in the submission element 306A of FIG. 3A may be indicative of a form provided for publication of content. Also, for example, the text "Post" in the submission element 306B of FIG. 3B may be indicative of a form provided for publication of content. Also, for example, in some implementations the computing device 130 may identify whether a form is provided for publication of content based on the destination address to which the content submitted via the form will be submitted. In some implementations the destination address may be identified based on code associated with the form and/or other aspects of the webpage prior to submission of the form. In some implementations the destination address may be identified upon submission of the form.

In some implementations the computing device 130 may identify whether a form is provided for publication of content based additionally and/or alternatively on text of the webpage. For example, the text "Edit Page 1" and/or "Please submit page edits via the below submission form" in FIG. 3A may be indicative of a form provided for publication of content. Also, for example, the text "Create Your Post" and/or "Please submit your post via the below submission form" in FIG. 3B may be indicative of a form provided for publication of content. In some implementations the computing device 130 may identify whether a form is provided for publication of content based additionally and/or alternatively on the URL of the webpage. For example, the URL 302A of the webpage of FIG. 3A includes "&action=edit", which may be indicative of a form that is provided for publication of content. Also, for example, the URL 302B of the webpage of FIG. 3B may include language that is indicative of a form that is provided for publication of content and/or may be referenced in a database as a URL that includes a submission form provided for publication of content.

At step 205 publication address data associated with the content submission form is identified. In some implementations one or more scripts may be activated that identify publication address data associated with one or more content submission forms displayed by the computing device 130. In some implementations the script may be activated on computing device 130 and/or authorship identification engine 120. The publication address data is indicative of a document address to which the content that is being submitted for publication will be published. For example, in FIG. 3A the publication address data may be the URL 302A of the webpage FIG. 3A. The URL 302A may identify that a webpage entitled "Page 1" is being edited and that the edited webpage is present on the website "www.example.com". Also, for example, in some implementations the publication address data is the URL to which the content that is being submitted for publication will be published. For example, the URL 302A may be analyzed to determine that the URL to which the content will be published will be "www.example.com/Page_1". In some implementations URL 302A may not be displayed in the graphical user interface of FIG. 3A. Also, for example, in FIG. 3B the publication address data may be the URL that provided the link to the URL 302B of the webpage FIG. 3B. For example, the user may have navigated to the URL 302B by clicking on a link to "create a post" on the URL "www.example.com/page3" for inclusion in the content of the URL "www.example.com/page3". For example, "www.example.com/page3" may be a question and answer page that enables users to submit answers to a question by selecting the "create a post" link and posts submitted at URL 302B may be published on "www.example.com/page3". In some implementations URL 302A may not be displayed in the graphical user interface of FIG. 3A. Also, for example, in FIG. 3B the publication address data may be the URL that is navigated to after selection of the submission element 306B. For example, the user may be directed to the URL that publishes the content submitted via the submission form after selecting the submission element 306B. For example, "www.example.com/page3" may be a topic in a forum that displays the user's post after the user selects the submission element 306B.

In some implementations the publication address data may be based on the content of the submission form. For example, in some implementations the form submission handler may identify a destination address to which the content will be submitted for publication and that destination address may be utilized as the publication address data. For example, the form submission handler of the content submission form of FIG. 3A may submit the content to a document address "www.example.com/title=Page_1&action=submit" and the publication address data may be based on that document address. For example, the publication address data may indicate that the content will be published somewhere on the website "www.example.com" and/or particularly on the web page "www.example.com/Page_1". Identification of a particular publication address may be based on, for example, analysis of the formatting of the document address to which the content will be submitted for publication. Also, for example, in some implementations structured data and/or other data associated with the content submission form may identify the particular destination address to which the content will be submitted and/or the particular publication address to which the content will be published. For example, in some implementations the destination address to which the content will be submitted may be identified based on the "action" attribute of the <form> tag. The publication address data may optionally be based on the identified destination address (e.g., a truncated portion of the address). The publication address data could then be utilized (e.g., with an indexing system) to crawl one or more documents to identify content that corresponds with the content data and to identify authorship of that content.

Also, for example, in some implementations the publication address data is an identifier that may be utilized to identify the URL to which content that is being submitted for publication will be published. For example, the identifier "example" may be utilized to identify the content will be published somewhere on "www.example.com". In some implementations the publication address data includes at least part of the hostname to which content that is being submitted for publication is being submitted. For example, the identifier for the form of FIG. 3A may be "example.com" to identify the hostname of "example.com" to which content that is being submitted for publication is being submitted.

At step 210 user identification data of a user is identified. The user identification data is indicative of data that identifies an author of the document. In some implementations the computing device 130 and/or the authorship identification engine 120 may identify the user identification data of the user. For example, a user of the computing device 130 may be logged in to a service when submitting the content via the content submission form and the computing device 130 may identify a user identification associated with that service. For example, in FIG. 3A the user may be logged in to a service associated with the "www.example.com" website to enable editing of pages on the "www.example.com" website and the user identification data may be based on the user identification for that service. Also, for example, the user identification may additionally and/or alternatively be based on a social networking service, a search service, an email service, and/or an authorship verification service to which the user is logged in. Also, for example, the user identification data may be based on an IP address, a MAC address, and/or other identifier associated with the computing device 130.

At step 215 submission of content by the user via the content submission form is recognized. In some implementations one or more scripts may be activated that recognize submission of content by the user via the content submission form. In some implementations the script may be activated on computing device 130 and/or authorship identification engine 120. In some implementations a form submission handler is utilized that recognizes submission of content via the submission form by a user. For example, the form submission handler may recognize selection of the submission element 306A of the submission form of FIG. 3A. For example, a user may utilize a keyboard, mouse, touch pad, touch screen, and/or other input device to select the submission element 306A and such action may be recognized. Forms may additionally and/or alternatively be submitted utilizing, for example, voice commands, and/or passage of a predefined period of time.

At step 220 verification data is provided for authorship identification in response to the submission of the content via the content submission form. The verification data may include the publication address data identified at step 205, the user identification data identified at step 210, and/or content data that is indicative of the content submitted via the content submission form. The content data provided for authorship identification is indicative of at least some of the content that is being provided via the content submission form for publication in one or more documents. For example, in some implementations the content data includes the entirety of the content that is being provided for publication. Also, for example, in some implementations the content data includes one or more portions of the content that is being provided for publication. For example, in some implementations the content data that is being provided for publication may include previously existing content and newly added content from the author. The newly added content from the author may be identified and only the newly added content provided as the content data. The newly added content may be identified based on, for example, tracking of edits by a user, and/or comparison of the content submitted for publication in a document to the currently published document. Also, for example, in some implementations the content data includes a content token associated with all or portions of the content that is being provided for publication.

In some implementations the content submitted via a form includes text that is not part of code in a document and/or text that is part of code in a document such as HTML coding. The text may be incorporated into a new and/or pre-existing document for publication. In some implementations the content submitted via a form may additionally and/or alternatively include one or more submitted documents such as a PDF document, an audio file, and/or an image file.

In some implementations, in response to submission of content via a form, computing device 130 provides the verification data to the authorship identification engine 120 and still submits the content to be published to the destination address associated with the form. The provided verification data is utilized for authorship identification of the content submitted via the form. For example, the provided verification data may be utilized to identify an author of the content submitted via the form after the content is published utilizing, for example, the method of FIG. 4. In some implementations the verification data is provided via an iframe, an img tag, and/or other AJAX transport mechanism.

Figure 3A:
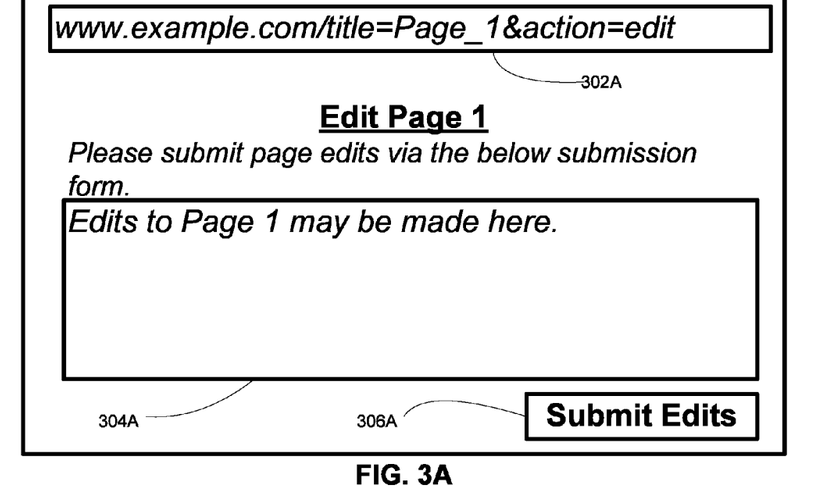
FIGS. 3A and 3B illustrate example graphical user interfaces for submitting content for publication via a content submission form.
Figure 3B:
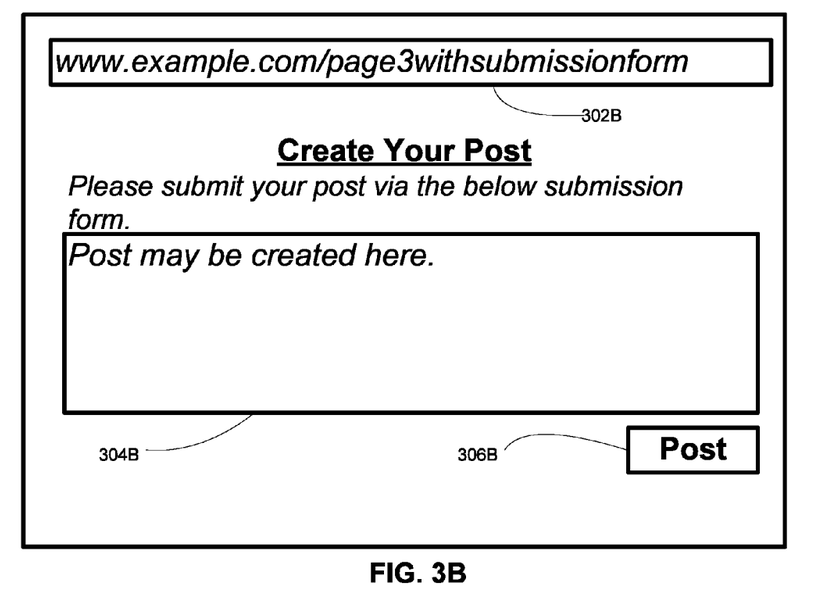

In some implementations a form submission handler is utilized that recognizes submission of content via the submission form by a user and transmits the verification data upon recognition of the submission. For example, the form submission handler may recognize selection of the submission element 306A by a user and cause submission of the publication address data, the user identification data, and the content present in form content area 304A for authorship identification. A different form submission handler or the same form submission handler may also cause submission of the content to a distinct destination address for publication of the content at a publication address. For example, a user may utilize a keyboard, mouse, touch pad, touch screen, and/or other input device to select the submission element 306A and such action may be recognized. In some implementations the submission handler provides content data for publication that is the same as the content submitted via the form for publication. In some implementations the form submission handler is installed as a duplicate submission handler to the existing submission handler for the form. For example, a first submission handler may be utilized that recognizes user submission of the form and provides at least some of the content of the form to a destination address for publication to a publication address in response to the user submission. A second submission handler may be utilized that recognizes user submission of the form and provides the verification data to a distinct verification address for authorship identification in response to the user submission. In some implementations additional and/or alternative data may be provided with the verification data. For example, in some implementations time stamp data indicative of the time of submission of content via the content submission form may additionally be provided.

Referring to FIG. 4, a flow chart illustrating an example method of identifying an author with Internet content based on received data is illustrated. Other implementations may perform the steps in a different order, omit certain steps, and/or perform different and/or additional steps than those illustrated in FIG. 4. For convenience, aspects of FIG. 4 will be described with reference to a system of one or more computers that perform the process. The system may include, for example, the authorship identification engine 120 and/or the crawler 110 of FIG. 1. In some implementations the association of an author with Internet content may be based on received verification data such as verification data provided in step 220 of the method of FIG. 2.

At step 400 publication address data, user identification data, and data indicative of content are received. In some implementations the publication address data, user identification data, and data indicative of content are received at the authorship identification engine 120 and/or the crawler 110 from the computing device 130 and/or one or more intermediary servers. In some implementations the publication address data, user identification data, and data indicative of content are provided in step 220 of the method of FIG. 2.

At step 405, a published document is crawled based on the publication address data. For example, in some implementations the publication address data may specifically identify the published document and the published document may be specifically crawled. Also, for example, in some implementations the publication address data may identify a website and/or a group of documents that are related to the published document and multiple documents of the website and/or group of documents may be crawled. For example, the crawler 110 may crawl a document identified by the publication address data and crawl a plurality of additional documents that are linked-to from that document.

The publication address data is indicative of a document address to which the content that is being submitted for publication will be published. For example, in some implementations the publication address data is indicative of a URL of the published document. For example, the publication address data provided in response to a submission of content via the form of FIG. 3A may include the URL "www.example.com/Page_1" that is the URL at which the content will be published. Also, for example, the publication address data provided in response to a submission of content via the form of FIG. 3A may include the URL "www.example.com/Page_1&action=edit", which may be analyzed to determine that the URL "www.example.com/Page_1" is likely the URL at which the content will be published. In some implementations the publication address data is a URL that, if crawled, is likely to lead to the published document. For example, the publication address data provided in response to a submission of content via the form of FIG. 3A may include the URL "www.example.com" which, if crawled, is likely to have one or more links that directly and/or indirectly link-to the published document. Also, for example, the publication address data provided in response to a submission of content via the form of FIG. 3A may be based on the destination address to which the content is submitted. The destination address may be utilized to identify one or more addresses which, if crawled, is likely to have one or more links that directly and/or indirectly link-to the published document.

In some implementations the published document is crawled as part of a periodic crawling process for the document. In some implementations the published document is crawled in response to an on-demand indexing request. In some implementations the published document is crawled in response to identification and transmission of data related to that document for authorship verification such as, for example, in response to step 220 of FIG. 2. For example, in response to a user submitting content to be published as all or part of a document and a corresponding transmission of verification data related to that content for authorship verification, the document may be added to a queue of a listing of documents for crawling at step 405. Also, for example, in response to a user submitting content to be published as all or part of a webpage of a website, and a corresponding transmission of verification data related to that content for authorship verification, the website may be added to a queue of a listing of documents for crawling at step 405.

At step 410 it is determined if content of the published document corresponds to the data indicative of content received at step 400. In some implementations the crawler 110 may determine if content of the published document corresponds to the data indicative of content received at step 400. In some implementations the crawler 110 may provide content from the published document to the author identification engine 120 and the author identification engine 120 may determine if content of the published document corresponds to the data indicative of content received at step 400. For example, the crawler 110 may index content from the published document with the published document in one or more databases such as content database 105.

The crawler 110 may provide identifying information of one or more of the documents and published data indicative of crawled actual content of the document to authorship identification engine 120 to enable authorship identification engine 120 to identify an author of the document. In some implementations the authorship identification engine 120 receives identifying information of one or more of the documents and/or published data indicative of crawled actual content of the document of the document directly from the crawler 110 and one or more intermediary servers. In some implementations the crawler 110 stores identifying information of one or more of the documents and/or published data indicative of crawled actual content of the document to one or more databases, such as the content database 105, and the authorship identification engine 120 retrieves the respective data from the one or more databases.

One or more methods and/or apparatus may be utilized to compare one or more aspects of the content of the published document with the content data for authorship identification. For example, the text of a document may be received at step 400 as content data for authorship verification of the document and compared to published text of the document at step 410. In some implementations an exact match between the text of a document provided for authorship verification of a document and the published text of the document may be required. In some implementations authorship of a document may be verified if a similarity threshold is met. For example, one or more measures of similarity and/or dissimilarity may be utilized to determine if a similarity threshold between the text of a document provided for authorship verification of the document and the published text of the document is met.

Also, for example, a content token may be received at step 400 as content data for authorship identification of the published document and compared to a content token of the published document. For example, in some implementations the content token may include a hash value generated by applying a hash function to some or all of the content submitted for publication in a document. The hash value may be injected into the content of the document for publication and may be provided for authorship identification. The hash value provided for authorship identification may be compared to a hash value in the published document to identify authorship of the document. Also, for example, in some implementations the content token may include a random number injected into the document for publication and provided for authorship identification. The random number provided for authorship identification may be compared to a random number in the published document to verify authorship of the document.

At step 415 an author is associated with the content of the published document if the content of the published document is determined to correspond to the content data for authorship verification at step 410. In some implementations the author associated with the content of the published document is not particularly identified. For example, a document may simply be identified as being associated with an author without particularly identifying the author and/or a property of the author (e.g., an entity that employs the author, other works of the author). In some implementations the author associated with the content of the published document and/or a property of the author is particularly identified. For example, the author may be identified based on the user identification data received at step 400. For example, the user identification data may include information about the author. Also, for example, the user identification data may be utilized to retrieve information about the author from one or more databases such as content database 105. The author may be an individual and/or an entity. For example, in some implementations the user identification data may identify the author as a particular individual that is associated with a particular entity such as a media outlet. Also, for example, in some implementations the user identification data may identify the author as a particular individual that is associated with a particular entity such as a non-media company. Also, for example, in some implementations the user identification data may identify the author as associated with a particular entity but not identify the particular individual.

In some implementations multiple authorship associations may be made with a single document. For example, a first author may be associated with a first portion of content of the document and a second author may be associated with a second portion of content of the document. For example, a webpage on a topic that allows contributions from multiple individuals may include multiple authors, with each author being associated with one or more aspects of the content of the webpage. The association of an author with content of a published document may be indexed in one or more databases such as content database 105. For example, in some implementations the authorship identification engine 120 may communicate with the crawler 110 to identify a document as a verified authorship document and the crawler 110 may index the document as a verified authorship document. Also, for example, in some implementations the authorship identification engine 120 may provide the author of the document to the crawler 110 and the crawler 110 may index the document as being associated with the provided author.

In some implementations time stamp data may optionally be analyzed in determining if the author should be identified with the document. The time stamp data may be indicative of the time of submission of content and may be utilized to determine if the content was submitted prior to any similar content also submitted for authorship identification. For example, if the content submitted for authorship identification is found to the same as other content present in another document and the time of publication of the other content precedes the time stamp data, then the author may not be identified with the content submitted for authorship identification. In some implementations the content submitted for authorship identification may be identified as copied content if the content submitted for authorship identification is found to be similar to other content present in another document and the time of publication of the other content precedes the time stamp data.

In some implementations the one or more authorship identifications associated with a document may be utilized to influence the relevance of the document based on whether the document is associated with an author and/or with a particular author. For example, the authorship identification may be indexed with the document and utilized as part of a ranking score for the document in response to a search query that identifies the document. For example, in some implementations if a document is associated with an author it may have a better ranking score than if it were not associated with an author. Also, for example, in some implementations a better ranking score may be supplied to a document if it is associated with a particular author. For example, a document relating to a health issue may have a better ranking if it is associated with an author who is an identified medical professional than if it is associated with no author and/or with an author that is not an identified medical professional.

In some implementations supplied verification data may be utilized to determine a change rate of content of a document and/or one or more URLs associated with a document such as URLs with the same hostname. For example, in some implementations a submission of verification data may be utilized to identify that a document and/or one or more URLS associated with the document has been changed. The change rate of a document and/or change rate of one or more URLs associated with the document may be utilized, for example, to determine when and/or how a document and/or hostname associated with the document is crawled. In some implementations supplied content data of submitted verification data may be utilized to determine trending terms and/or phrases. For example, the frequent occurrence of certain terms and/or phrases in supplied verification data from multiple authors over a given term period may indicate the terms and/or phrases are trending terms and/or phrases.

In some implementations one or more aspects of authorship identification associated with a document may optionally be securely stored in content database 105 or other database and may not be publicly available. For example, in some implementations the particular author associated with a document may not be accessible. In some versions of those implementations one or more properties of the particular author associated with a document may be accessible. For example, in some implementations the popularity of an author, expertise of an author, a ranking associated with the author, and/or additional properties of the author may be accessible but not identified with a particular author. Also, for example, in some implementations the authorship information for a document may be supplied in combination with search results for that document. For example, the search results for a document may identify the author and/or include information about the author of that document.

In some implementations one or more features of the particular author associated with a document may not be accessible but may be utilized in one or more applications. For example, features of a particular author associated with a document may be utilized to determine whether a document is identified as responsive to a query and/or as part of the ranking of that document in response to the query. For example, in some implementations a search request may be submitted that includes a request to restrict and/or weight returned results utilizing information pertinent to authorship of the results. For example, returned results may be restricted to only those that are identified with a registered author. The authorship information associated with the documents may be utilized to restrict and/or weight the search results of the search request according to the request. The search results that are restricted and/or weighted based on the authorship information may then be transmitted to at least one computing device such as computing device 130. Optionally, although obtained search results may be based on authorship information, they may be transmitted without directly including any such authorship information.

Figure 5:
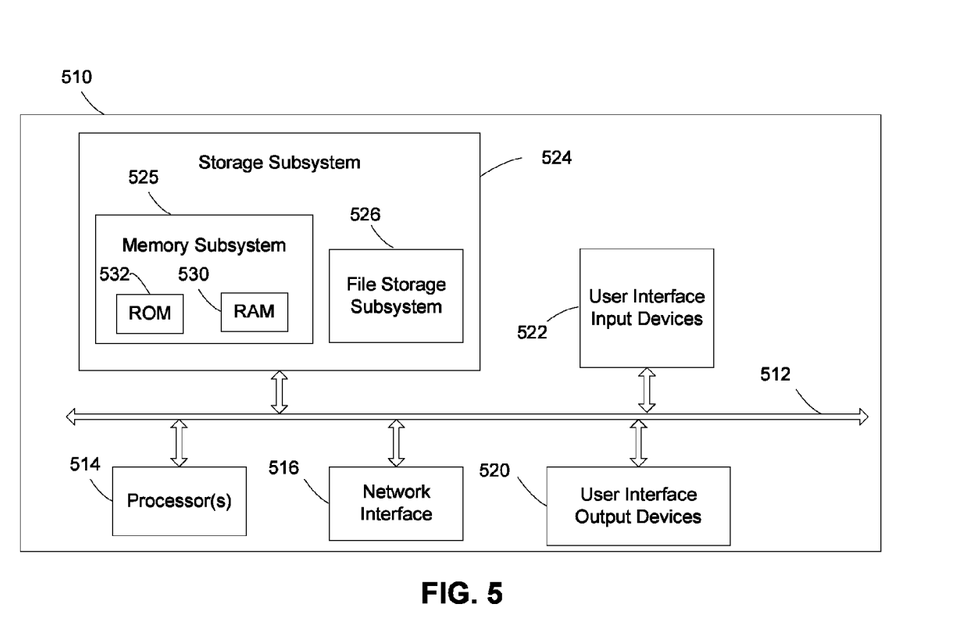
FIG. 5 illustrates a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 526 and a file storage subsystem 528, user interface input devices 522, user interface output devices 520, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to identify and/or transmit data related to authorship identification of Internet content and/or to identify an author with Internet content based on received author verification data according to one or more processes described herein.

These software modules are generally executed by processor 514 alone or in combination with other processors. Memory 526 used in the storage subsystem can include a number of memories including a main random access memory (RAM) 530 for storage of instructions and data during program execution and a read only memory (ROM) 532 in which fixed instructions are stored. A file storage subsystem 528 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 528 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several inventive implementations have been described and illustrated herein, a variety of other means and/or structures for performing the function and/or obtaining the results and/or one or more of the advantages described herein may be utilized, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer implemented method, comprising:
    identifying a content submission form on a webpage, wherein the content submission form enables submission of user provided content to a destination address for publication of the content to a publication website;
    identifying publication address data, the publication address data indicative of the publication address at which content submitted via the content submission form will be published;
    identifying user identification data associated with a user, the user accessing the webpage via a computing device of the user;
    recognizing, by a form submission handler, submission of the content by the user via the content submission form, the submission of the content via the content submission form being in response to user interface input of the user via one or more user interface input devices of the computing device;
    transmitting, in response to submission of the content by the user, the publication address data, the user identification data, and content data indicative of at least some of the content to a verification address for authorship verification, the verification address distinct from the publication address;
    wherein the form submission handler transmits the publication address data, the user identification data, and the content data to the verification address for authorship verification; and wherein the form submission handler or a second form submission handler submits the content to the publication address.

2. The method of claim 1, wherein the form submission handler is initialized through a browser plug-in.

3. The method of claim 1, wherein the content submission form includes a submission element enabling submission of the content by the user via the content submission form.

4. The method of claim 3, wherein the transmitting step is performed in response to selection of the submission element by the user.

5. The method of claim 1, further comprising transmitting, in response to submission of the content by the user, time stamp data indicative of time of submission of the content by the user via the submission form.

6. The method of claim 1, further comprising verifying the user as an author of the content based on the publication address data, the user identification data, and the content data.

7. The method of claim 1, wherein the content data includes the entirety of the content.

8. The method of claim 7, further comprising verifying the content is present at the publication address.

9. The method of claim 7, further comprising verifying the user as an author of the content in response to verifying the content is present at the publication address.

10. The method of claim 1, wherein the content data includes a content token indicative of the content.

11. The method of claim 10, further comprising incorporating the content token in the submission of the content by the user to the publication address.

12. The method of claim 11, further comprising verifying the content token is included with the content at the publication address and verifying the user as an author of the content in response to verifying the content token is included with the content at the publication address.

13. The method of claim 1, wherein the publication address data is based on the publication address.

14. The method of claim 13, further comprising identifying the publication address via crawling one or more documents, wherein the documents are identified for crawling based on the publication address and include a publication document that is accessible at the publication address.

15. The method of claim 1, wherein the publication address data includes the publication address.

16. A system including memory and one or more processors operable to execute instructions stored in the memory, comprising instructions to:
identify a content submission form on a webpage, wherein the content submission form enables submission of user provided content to a destination address for publication of the content to a publication address;
identify publication address data, the publication address data indicative of the publication address at which content submitted via the content submission form will be published;
identify user identification data associated with a user, the user accessing the webpage via a computing device of the user;
recognize, by a form submission handler, submission of the content by the user via the content submission form, the submission of the content via the content submission form being in response to user interface input of the user via one or more user interface input devices of the computing device;

transmit, in response to submission of the content by the user, the publication address data, the user identification data, and content data indicative of at least some of the content to a verification address for authorship verification, the verification address distinct from the publication address;
wherein the form submission handler transmits the publication address data, the user identification data, and the content data to the verification address for authorship verification; and
wherein the form submission handler or a second form submission handler submits the content to the publication address.

17. The system of claim 16, wherein the form submission handler is initialized through a browser plug-in.

18. The system of claim 16, wherein the content submission form includes a submission element enabling submission of the content by the user via the content submission form.

19. The system of claim 18, wherein the instructions to transmit the publication address data, the user identification data, and the content data are executed in response to selection of the submission element by the user.

20. The system of claim 16, wherein the instructions further comprise instructions to transmit, in response to submission of the content by the user, time stamp data indicative of time of submission of the content by the user via the submission form.

21. The system of claim 16, wherein the instructions further comprise instructions to verify the user as an author of the content based on the publication address data, the user identification data, and the content data.

22. A non-transitory computer readable storage medium storing computer instructions executable by a processor to perform a method comprising:
identifying a content submission form on a webpage, herein the content submission form enables submission of user provided content to a destination address for publication of the content to a publication address;
identifying publication address data, the publication address data indicative of the publication address at which content submitted via the content submission form will be published;
identifying user identification data associated with a user, the user accessing the webpage via a computing device of the user;
recognizing, by a form submission handler, submission of the content by the user via the content submission form, the submission of the content via the content submission form being in response to user interface input of the user via one or more user interface input devices of the computing device;
transmitting, in response to submission of the content by the user, the publication address data, the user identification data, and content data indicative of at least some of the content to a verification address for authorship verification, the verification address distinct from the publication address;
wherein the form submission handler transmits the publication address data, the user identification data, and the content data to the verification address for authorship verification; and
wherein the form submission handler or a second form submission handler submits the content to the publication address.

* * * * *